Dec. 25, 1962  W. BERTRAM  3,069,985
ADJUSTING DEVICE FOR CAMERAS
Filed Sept. 30, 1960  4 Sheets-Sheet 1
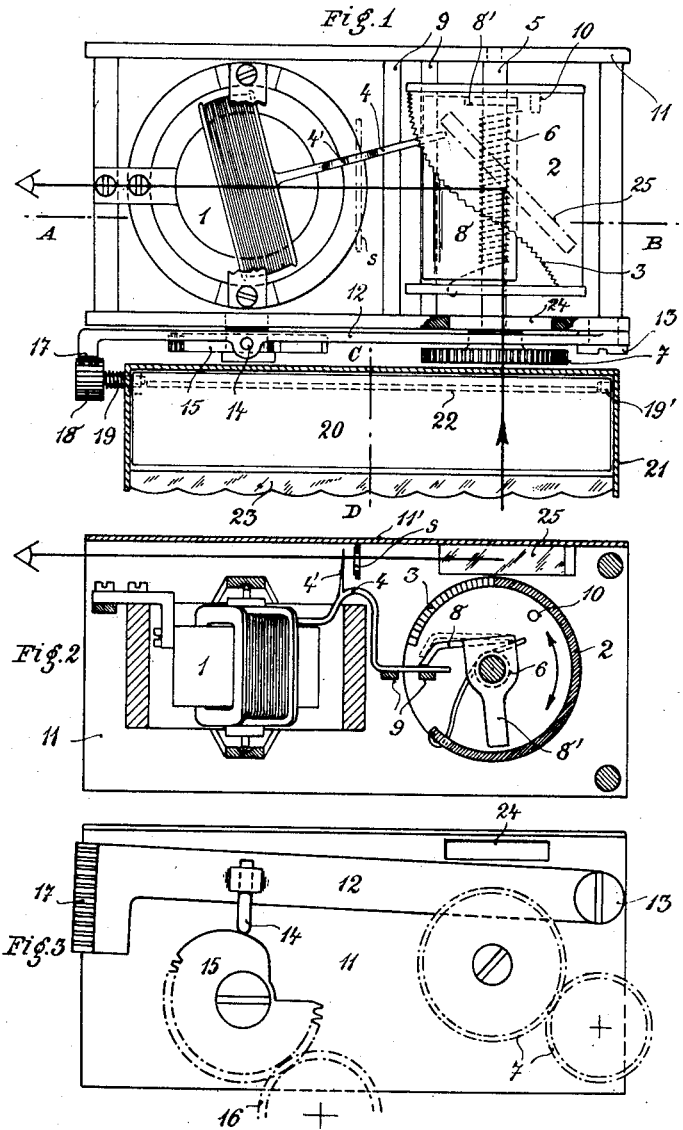
INVENTOR.
WILHELM BERTRAM
BY Dec. 25, 1962     W. BERTRAM     3,069,985
ADJUSTING DEVICE FOR CAMERAS
Filed Sept. 30, 1960     4 Sheets-Sheet 2
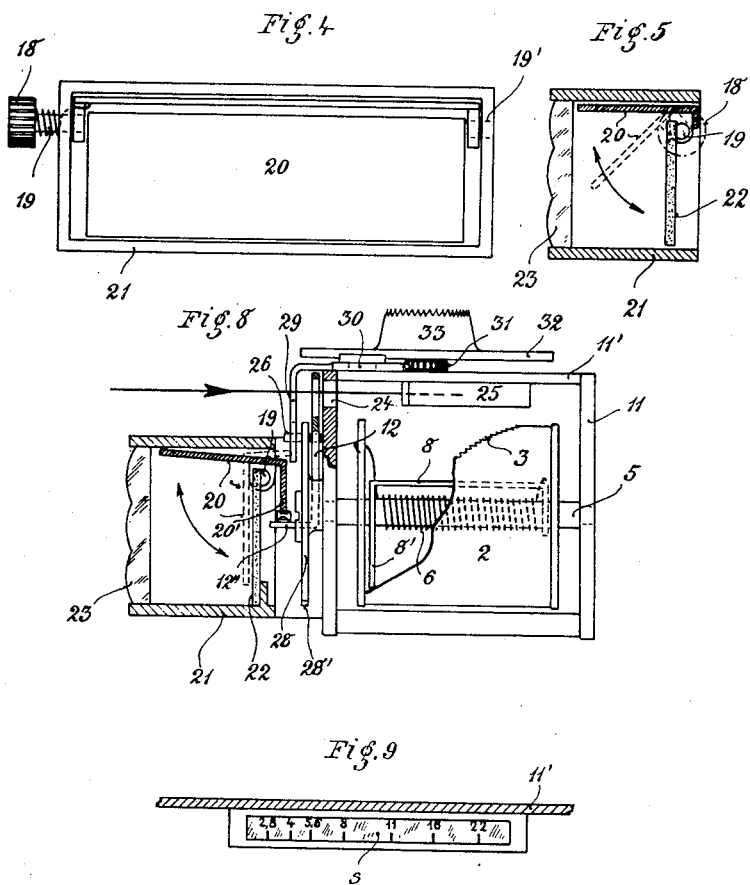
INVENTOR.
WILHELM BERTRAM
BY

Dec. 25, 1962 W. BERTRAM 3,069,985
ADJUSTING DEVICE FOR CAMERAS
Filed Sept. 30, 1960 4 Sheets-Sheet 3
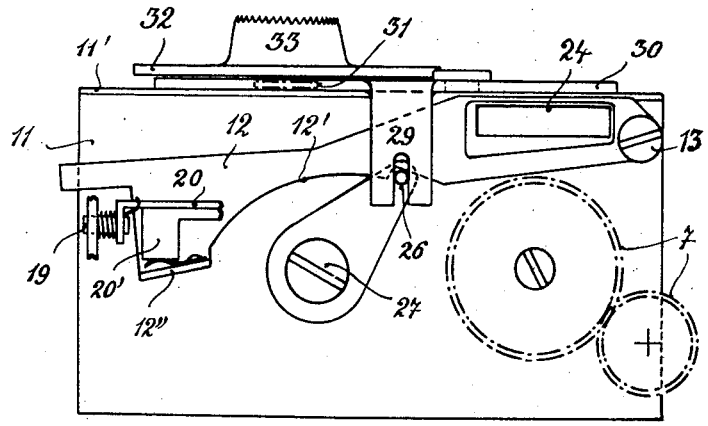
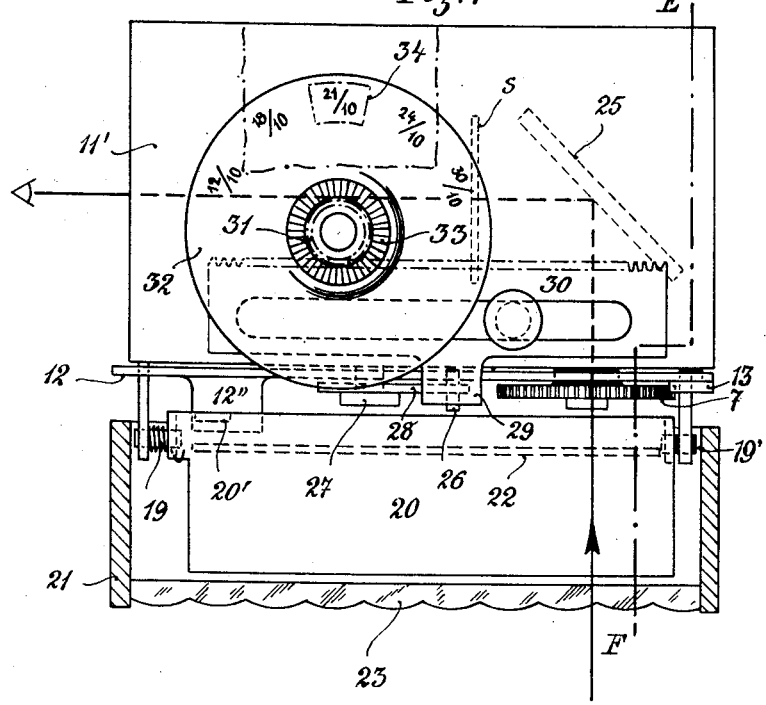
INVENTOR.
WILHELM BERTRAM Dec. 25, 1962 W. BERTRAM 3,069,985
ADJUSTING DEVICE FOR CAMERAS
Filed Sept. 30, 1960 4 Sheets-Sheet 4
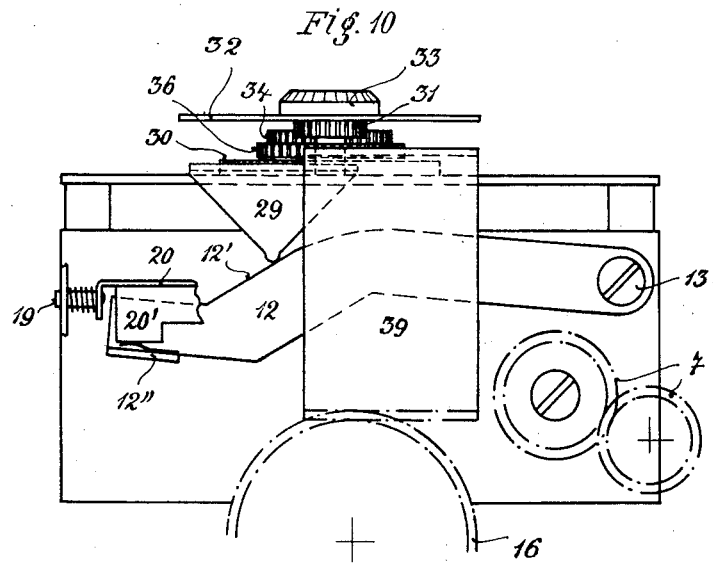
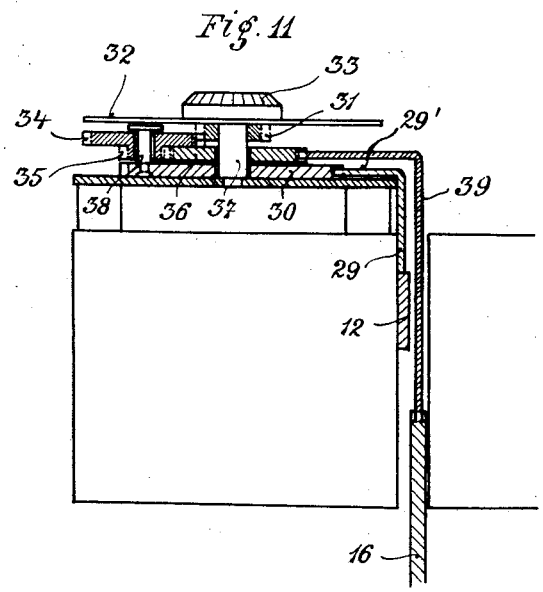
INVENTOR.
WILHELM BERTRAM United States Patent Office 3,069,985
Patented Dec. 25, 1962

3,069,985
ADJUSTING DEVICE FOR CAMERAS
Wilhelm Bertram, Munich-Pasing, Germany, assignor to Ernst and Wilhelm Bertram, Munich-Pasing, Germany, a German firm
Filed Sept. 30, 1960, Ser. No. 59,684
Claims priority, application Germany Oct. 2, 1959
10 Claims. (Cl. 95—10)

Devices for automatic adjustment of the exposure values of diaphragm, time and film sensitivity for cameras are known which are provided with a spring-loaded control member for a diaphragm in front of a photoelectric cell, which diaphragm adjusts the light value of the photoelectric cell according to the sensitivity of the film. It is further known to coordinate e.g. by means of the shutter time and diaphragm or time and film sensitivity.

The invention is an improvement over prior art devices particularly in respect to means permitting adjustment of the photoelectric cell in accordance with the sensitivity of the film being used. A feature of the construction is that adjustment for film sensitivity may be made either manually, e.g., by a separate dial setting, or manually in accordance with the setting of a time ring of the shutter on those cameras which are equipped with time adjustments for film sensitivity. In one embodiment a lever member is provided which adjusts a screen to shield the photoelectric cell in proportion to the film sensitivity so that actuation thereof will always account for such sensitivity. In this embodiment the means for screening the photoelectric cell is adjusted by a connection through the time ring.

In accordance with another feature of the invention means are provided to adjust for film sensitivity entirely by a manual dial setting arrangement independent from any timing ring setting to vary the position of the screen adjacent a photoelectric cell.

In still another embodiment of the invention, means are provided to permit adjustment of the photoelectric cell either manually by a separate adjustment dial mechanism or by manually setting the time ring of the film shutter. In such an arrangement, a differential is provided so that the dial adjustment may be cut in or out as desired independently of the adjustment provided from the time ring.

A further advantage of the invention is that it indicates optically in the finder the diaphragm adjusted corresponding to the time and film sensitivity values and that it can be controlled before releasing the shutter.

Finally the simple construction must be emphasized, by which the movable parts are limited to a minimum whereby the functioning safety is increased, a fact which is very important for such devices which are incorporated in cameras in inaccessible locations. A further favorable consequence of the diminution of the number of the single components resides in the saving of space which is essential particularly for cameras and also from an economic point of view in general.

Other objects and advantages will be apparent from a consideration of the specification and claims.

FIG. 1 is a plan view partly in section of a device for adjusting the light incident on a photoelectric cell for influencing the settings of a camera constructed in accordance with the invention;

FIG. 2 is a section taken along line A—B of FIG. 1;

FIG. 3 is a side elevation of the device shown in FIG. 1 with the photocell portion not shown;

FIG. 4 shows a casing of a photoelectric cell in plan view;

FIG. 5 shows the same part in a cross section C—D of FIG. 1;

FIG. 6 is a view similar to FIG. 3 of another embodiment of the film sensitivity adjusting device with the control member;

FIG. 7 is a plan view partly in section through the casing of the photoelectric cell of the embodiment of FIG. 6;

FIG. 8 shows a transverse section along the line E—F of FIG. 7;

FIG. 9 shows an indicating device of the diaphragm in front elevation;

FIG. 10 is a view similar to FIG. 3 of still another embodiment of the invention; and FIG. 11 is a section offset by 90° to FIG. 10.

As is shown in FIGS. 1 and 2 the measuring instrument consists, in the embodiment indicated, of the moving coil system 1 and the scanning device of the hollow cylinder 2, the jacket teeth 3 of which scan the indicator 4 of the moving coil system 1. The hollow cylinder 2 is kept under tension by the coil spring 6 arranged around its axle 5 and controls by means of spur gears 7 (FIGS. 1 and 3) or other transfer means the diaphragm according to the deflection of the indicator 4.

In order to lock the indicator 4 in its deflection position a flap 8 is carried on the hollow cylinder shaft 5, which flap is biased by means of the coil 6 on the indicator 4 in its deflection position against a support 9. This position is shown in FIG. 4. The support 9 may consist of a single transverse bar or of two bars at a distance from each other as shown in order to make possible the passage of the interrupted hollow cylinder jacket 2.

It is known to lock the indicator of a measuring device in its intermediate position by controlled yokes and to discharge in this manner the moving coil system but the new locking has the advantage as compared with the devices known up to now that it is simple and useful, the flap 8 being introduced within the hollow space of the cylinder 2 and by controlling it by this latter in the same direction. This control is made by a pin 10 arranged on the inner side on the one cylinder front wall, the position of which pin is chosen in such a manner that the flap 8 is pressed shortly before the engagement of the scanning teeth 3 with the indicator 4 on this latter by means of angularly protruding plug 8' and is lifted again from the indicator as it is shown in dash-and-dot lines in FIG. 2 when the cylinder is pivoted back into its initial position.

As usual the hollow cylinder 2 is turned back by the diaphragm when the shutter is set and thus also the coil spring 6 influencing the hollow cylinder 2 is set as well.

According to the invention there is furthermore provided for determining the exact diaphragm value and the film sensitivity values one single spring loaded member. This member consists in all examples of a lever 12 which is linked at 13 on a front wall of the casing 11 containing the measuring device 1 and the hollow cylinder 2, see FIG. 3. The lever member 12 is shifted in position to adjust the setting of the photocell by a moveable operating member which in this embodiment comprises a cam disc 15. This lever reposes by means of a pin 14 on a cam disk 15 which is partially toothed on its periphery and is connected by means of further spur gears 16 (in FIG. 3 only one spur gear is shown) with the time adjusting ring of the shutter. Instead of a wheel gear mechanism it is also possible to provide lever rods or the like.

Lever 12 regulates the amount of light acting on the photoelectric cell according to the corresponding film sensitivity value. For this purpose the free end of lever 12 is configurated as a rack 17 directed vertically downward, in which rack a pinion 18 engages. This pinion is fastened on a stud 19, cf. FIGS. 1, 4 and 5, which is fixed on a diaphragm 20 which is arranged in the casing 21 of the photo-electric cell in connection with the opposed stud 19' and which is in front of the said cell in such a manner, that the photo-electric cell can be covered by the again spring-loaded diaphragm 20 till the exposure value is cancelled. 23 is the honey-comb window of the photo-electric cell.

FIG. 1 shows the total arrangement of the single aggregates. In front of the casing 11 containing the measuring device 1 and the hollow cylinder 2 there is arranged the casing 21 of the photo-electric cell 22, while the two casings 11, 21 have arranged between them the control lever 12 with the elements 7, 14–17. This construction yields a mounting unit with a minimum expense of space which can be incorporated in any type of camera. The casing 21 of the photo-electric cell is offset towards the casing 11 (cf. of FIG. 8) in such a manner that the light can take its path to the finder through the casing 21 of the photo-electric cell, through the opening 24 of the neighbouring lateral wall of casing 11 to the mirror 25 which can be introduced in the path of the rays. This mirror is arranged on the under surface of the lid 11' of the casing 11 and reflects the light into the (not shown) finder chamber. In FIG. 8 the path of the rays is shown in full lines.

Within the path of the rays and more particular in the deflection range of the indicator an indicator device is arranged which determines by optical means whether the used film has a sensitivity making possible the taking of the picture in question.

According to the example shown in FIGS. 1, 2 and 9 this device consists of a transparent scale showing the diaphragm values, cf. particularly FIG. 9 fixed on the lower surface of lid 11'. The indicator 4 has an auxiliary indicator 4', cf. FIG. 2 which shows with the deflection of the indicator the diaphragm opening in the (not shown) finder.

The arrangement may also be made in an inverted manner providing the scale s as a bent segment arranged on edge on the indicator 4 and by passing the scale, when the indicator deflects, in front of a stationary window, where the value of the diaphragm may be read off.

Instead of a scale provided with figures it is possible, too, to provide a colour scale, e.g. in such a manner that the valid diaphragm range is indicated by a green stripe. On this stripe there may be on both sides small red spots (points or the like). If one of these spots appears in the finder, it is not possible to take the view in question and the film must be interchanged against another one with another sensitivity.

It is, of course, possible to combine figure and colour scales.

Assuming that a shutter taking into consideration time and film sensitivity is involved the handling and fuctioning of the example according to FIGS. 1 to 5 is as follows:

First the shutter is set and thus the hollow cylinder 2 coupled with the diaphragm as well as the flap 8 are brought by means of the gear mechanism 7 into their starting position and thus the indicator 4 is released.

Thereupon the film sensitivity is adjusted on the shutter and the time is pre-selected in those instances where the time ring provides an adjustment for film sensitivity, so that the timing ring of the first pivots by means of the gear mechanism 14, 16, 15 lever 12, whereby by means of the gear 17, 18 the flap 20 is controlled, of the position of which depends the efficiency of the photo-electric cell 22. This results in a deflection of the indicator 4 according to the light reflected by the object, which indicator now indicates by means of its auxiliary indicator 4' on the scale s the diaphragm opening corresponding to the time and to the sensitivity of the film.

This takes place before releasing the shutter and by modification of the distance between camera and object possibly the depth of focus can be taken into consideration.

Now the shutter is released which releases during its running off the hollow cylinder 2 till this latter touches the indicator 4 which is kept stationary shortly before by the flap 8 controlled by pin 10. The rotating hollow cylinder 2 adjusts the diaphragm opening by means of the gear mechanism 7 to the diaphragm opening necessary for the exposure and the diaphragm opening value is indicated on the scale s.

While up to now with the automatically working cameras the diaphragm opening could not be controlled by the user, the diaphragm opening value is unequivocally indicated according to the invention and thus the user has the possibility to control the depth of focus or to determine whether at all the exposure can be made with the sensitivity of the film in question. There is, under certain circumstances, the case that the auxiliary indicator 4' does not appear at all in front of the scale, whereby the user is informed that this exposure cannot be made with this film and that a film with another sensitivity must be used.

The second embodiment as shown in FIGS. 6 to 8 is different from the one described hereinbefore in respect to the provision of a separate manual dial control for influencing the photoelectric cell to account for film sensitivity independently of any time ring setting for time and film sensitivity.

12 is again the lever which can be pivoted around 13. The lower edge 12' of this lever has the shape of a curve by means of which the lever 12 reposes on the stud 26. This stud is arranged on lever 28 which can be pivoted around 27. Stud 26 is straddled by the slotted lug 29 which protrudes vertically from a rack 30 which is carried on lid 11' of the casing 11 in such a way that it can be shifted in a longitudinal direction, cf. FIG. 7. Into the rack engages the pinion 31 rotatably carried on lid 11', which pinion is rigidly connected with the adjustment disk 32 indicating the sensitivity of the film. The disk 32 forms with the head 33 one integral unit, the peripheral grooving of which makes possible the adjustment of disk 32. The disk 32 is provided with a scale showing the sensitivity of the film, cf. FIG. 7 and shows through a window 34 of the cover the indicated film sensitivity.

The lever 12 serves, as in case of FIGS. 1 to 5, to pivot the diaphragm 20 covering the photoelectric cell 22. This diaphragm reposes with a nose 20' on a bent-off lug 12" of lever 12, whereby the diaphragm 20 by its spring remains continuously in contact with lug 12". If the lever 12 is pivoted by the rotation of lever 28, whereby pin 26 slides along on the curve 12', the pivoting of the diaphragm 20 and thereby the covering of the photoelectric cell is made by means of the deflection of lever 12.

The function is in this example similar to that hereinbefore described, only with the difference that the shutter time ring has only a fixed time setting but no adjusting means for the film sensitivity, which latter is thus adjustable separately from the time according to the example of FIGS. 6 to 8.

The shutter is set first again by the diaphragm through the gear mechanism 7 and thus the hollow cylinder 2 with its flap 8 is brought to the initial position.

The film sensitivity is then adjusted by rotating the disk 32 by means of the knob 33 and is read in the window 34. The rotation of the knob 33 takes place through the gear mechanism 31, 30 by an adjustment of the driver 29 and thus of the lever 28 with its pin 26 which slides along the curve 12' and controls the lever 12 and the diaphragm 20 arranged in front of the photoelectric cell 2 via the lugs 12" and 20'.

When releasing the shutter the indicator 4 is again released and shows the diaphragm value on the scale s in coincidence with the time and the film sensitivity.

The adjustment device according to FIGS. 6 and 8 can be used also in the embodiment according to FIGS. 1 to 5 in a manner similar to that indicated by a third embodiment which is shown in FIGS. 10 and 11.

For this purpose there is incorporated between the adjusting knob 33 with its scale disk 32 and the adjustment lever 12 a differential which comprises the following components.

Under the scale disk 32 this latter is again connected with the pinion 31, which is mounted together with the disk 32 and the adjustment knob 33 loosely but with such a friction on the axle 37 that this unit cannot rotate independently but only by a pressure of the finger. The pinion 31 is engaged by the planet wheel 34 which forms a complete unit with the pinion 35 and which is journalled on the pin 38 which is fastened in relatively large gear wheel 30 (corresponding to the rack 30 in FIG. 7). The said pinion meshes with another spur gear 36, which again is mounted loosely with that underneath it on the axle 37. The angular arm 39 engages the gear wheel 36, which arm with its rack-shaped end is shifted to and fro by the time ring of the shutter by means of the gear mechanism 16. The wheel 30 is connected with the rack 29', which carries the nose 29 bearing on lever 12 (corresponding to pin 26 in FIG. 6).

If the film sensitivity is to be adjusted separately from the time the scale disk 32 is adjusted by means of the knob 33 according to the sensitivity of the film and thus of pinion 31. The components 16, 37, 36 which are in connection with the shutter remain, however, in a not operated state.

The rotation of the pinion is transferred to the wheel 34, which now rotates the wheel 30 through the journalling pin 38 and adjusts in this way the angular arm 29' with the nose 29, whereby the lever 12 is pivoted correspondingly. The wheel 36 remains stationary.

If, however, the film sensitivity is fixed, the gear mechanism 16, 39, 36 is first operated in order to adjust the time, starting from the shutter, by means of the timing ring and thus, because of the stationary wheel 31, the journal pin 38 is again rolled off with its wheel 34 on the pinion 31 and again the rotation is transferred to the wheel 30 and by the angle component 29', 29 to the lever 12.

This device has the advantage that it makes possible to couple also shutters of older design, which are provided only with a time ring, also with the film sensitivity.

I claim:

1. In a camera having an adjustable diaphragm shutter timing means, a photoelectric cell for sensing exposure conditions, needle means movable by actuation of said photoelectric cell in proportion to lighting conditions on the subject to be photographed, means responsive to the movement of said needle means and connected to said diaphragm to adjust the opening of the diaphragm accordingly, the improvement, comprising a housing, a screen member movable to shield said photoelectric cell by a predetermined amount, and an adjusting lever member pivotally mounted at one end on said housing and connected to said screen member at its free end, a movable operating member adapted to move said lever member to move said screen to adjust said photoelectric cell for film sensitivity, and means mounting said operating member on said housing for movement.

2. In a camera according to claim 1, wherein said operating member includes means connectable to said shutter timing means to move said screen member in accordance with the setting of said shutter timing means.

3. In a camera according to claim 1, wherein said operating member includes a dial for separately setting film sensitivity, and differential means to disconnect said dial from said lever member, and including means adapted to be connected to said shutter timing means operatively connected to said lever member.

4. In a camera having a housing, an adjustable diaphragm shutter timing means, a photoelectric cell mounted on said housing for sensing exposed conditions, needle means in said housing movable by actuation of said photoelectric cell in proportion to lighting conditions on the subject to be photographed to an indicating position, and a drum rotatable in accordance with the indicating position of said needle means, and means responsive to movement of said drum connected to said diaphragm to adjust the opening of said diaphragm, the improvement, comprising a lever member pivotally mounted at one end on said housing, a screen in said photoelectric cell, a rotatable member carrying said screen and being rotatable with said screen to shield said photoelectric cell by a predetermined amount, means interconnecting said lever and said rotatable member to rotate said rotatable member in accordance with pivotal movement of said lever, and means to move said lever including a moveable operating member, and means mounting said movable member on said housing for movement.

5. In a camera according to claim 4, wherein said means to move said lever includes a manually adjustable dial member.

6. In a camera according to claim 4, wherein said means to move said lever includes a cam member rotatably mounted on said housing and connectable to said shutter timing means.

7. In a camera according to claim 6, wherein said lever member includes a follower intermediate its length resting on said rotatable cam member.

8. In a camera according to claim 4, wherein said means to move said lever includes disengageable manually adjustable means.

9. In a camera according to claim 4, wherein said needle means includes means to indicate the opening of said diaphragm.

10. In a camera according to claim 4, wherein said needle means includes a pivotal needle, a rotatable scanning drum having stepped areas thereon adapted to engage said needle in accordance with the position which it assumes, said drum being rotatably mounted in said housing and connectable to means for operating said diaphragm opening, means movable by rotation of said scanning drum to lock the needle at its indicating position just prior to contact of said stepped portion of said scanning drum with said needle for setting said diaphragm opening.

References Cited in the file of this patent

UNITED STATES PATENTS

| | | |
|---|---|---|
| 2,213,749 | Strauss | Sept. 3, 1940 |
| 2,351,834 | Phillips | June 20, 1944 |
| 2,902,968 | Barthruff | Sept. 8, 1959 |
| 2,918,854 | Malek | Dec. 29, 1959 |
| 2,930,282 | Herterich | Mar. 29, 1960 |
| 2,940,046 | Herterich | June 7, 1960 |
| 2,952,194 | Goshima | Sept. 13, 1960 |